UNITED STATES PATENT OFFICE.

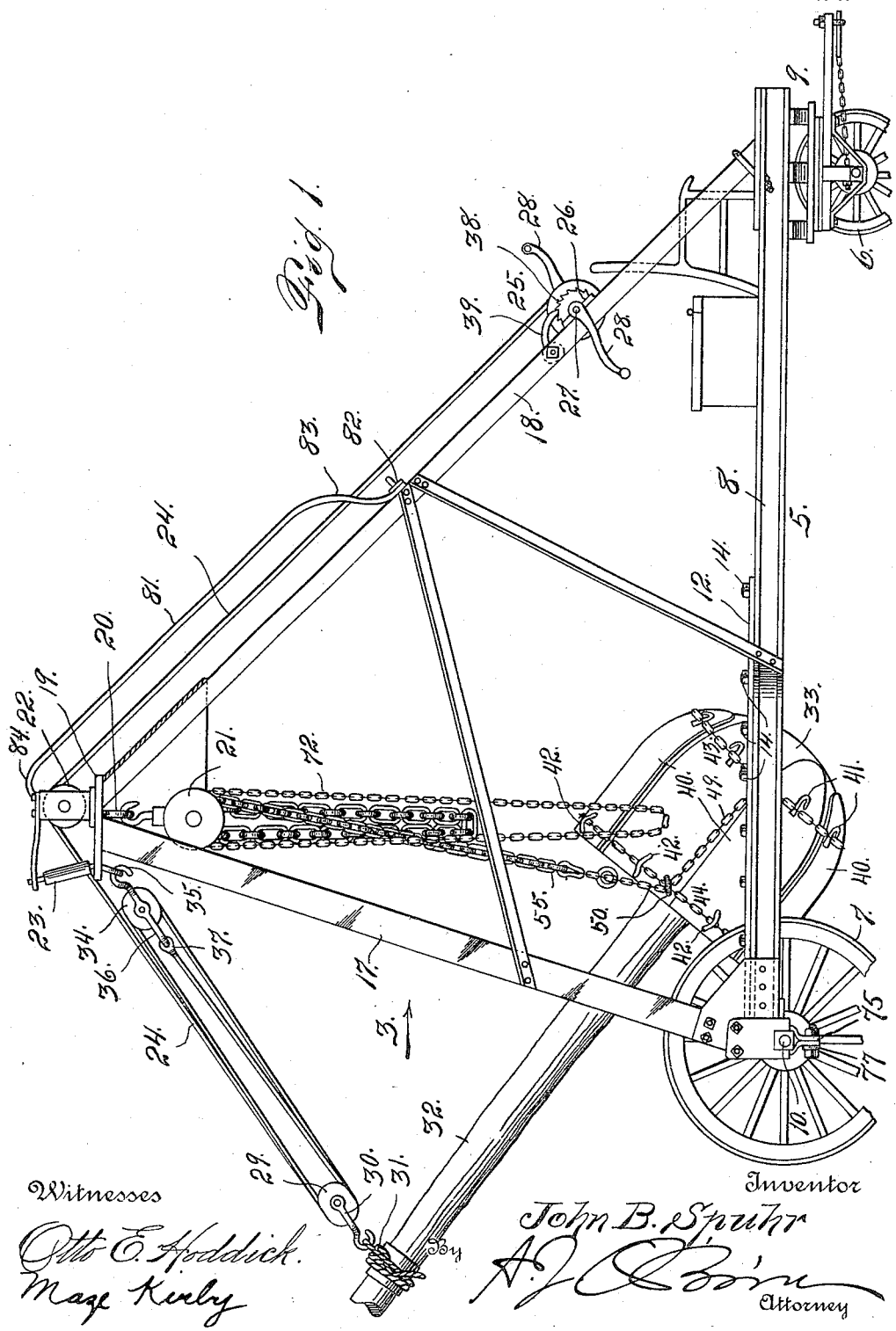

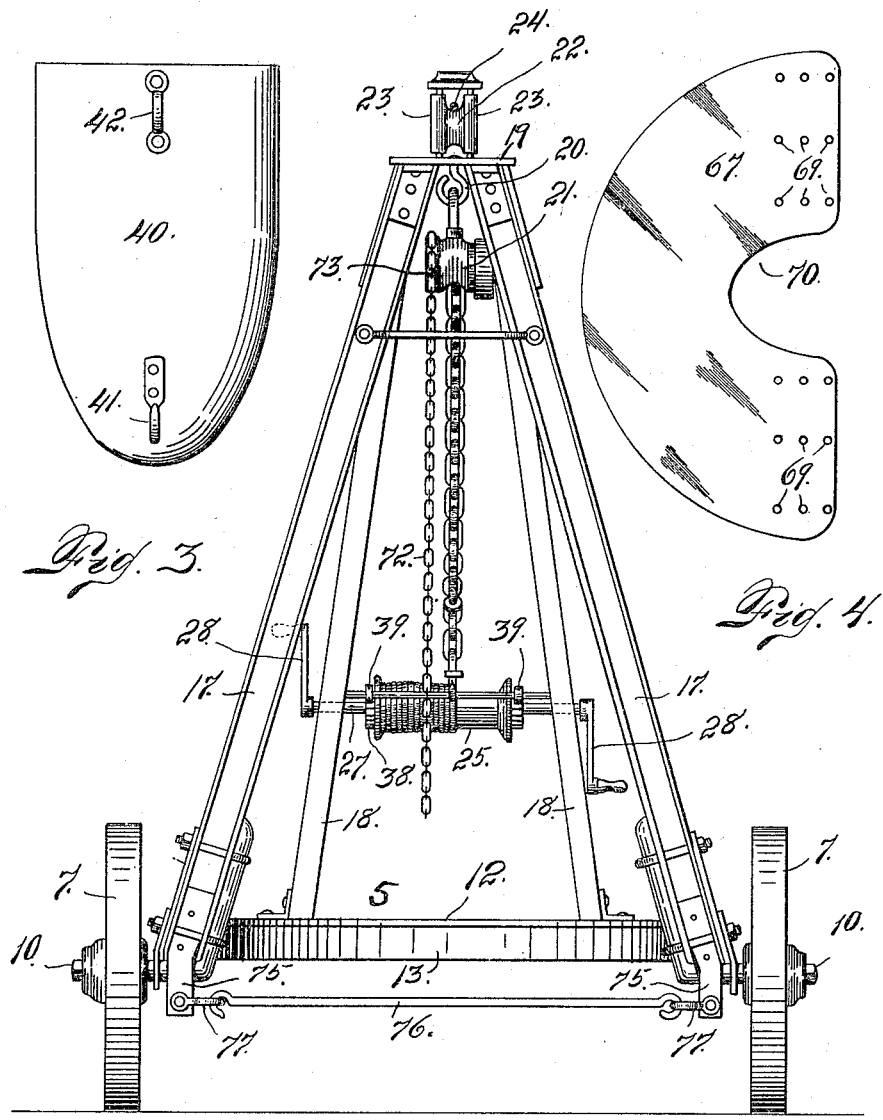

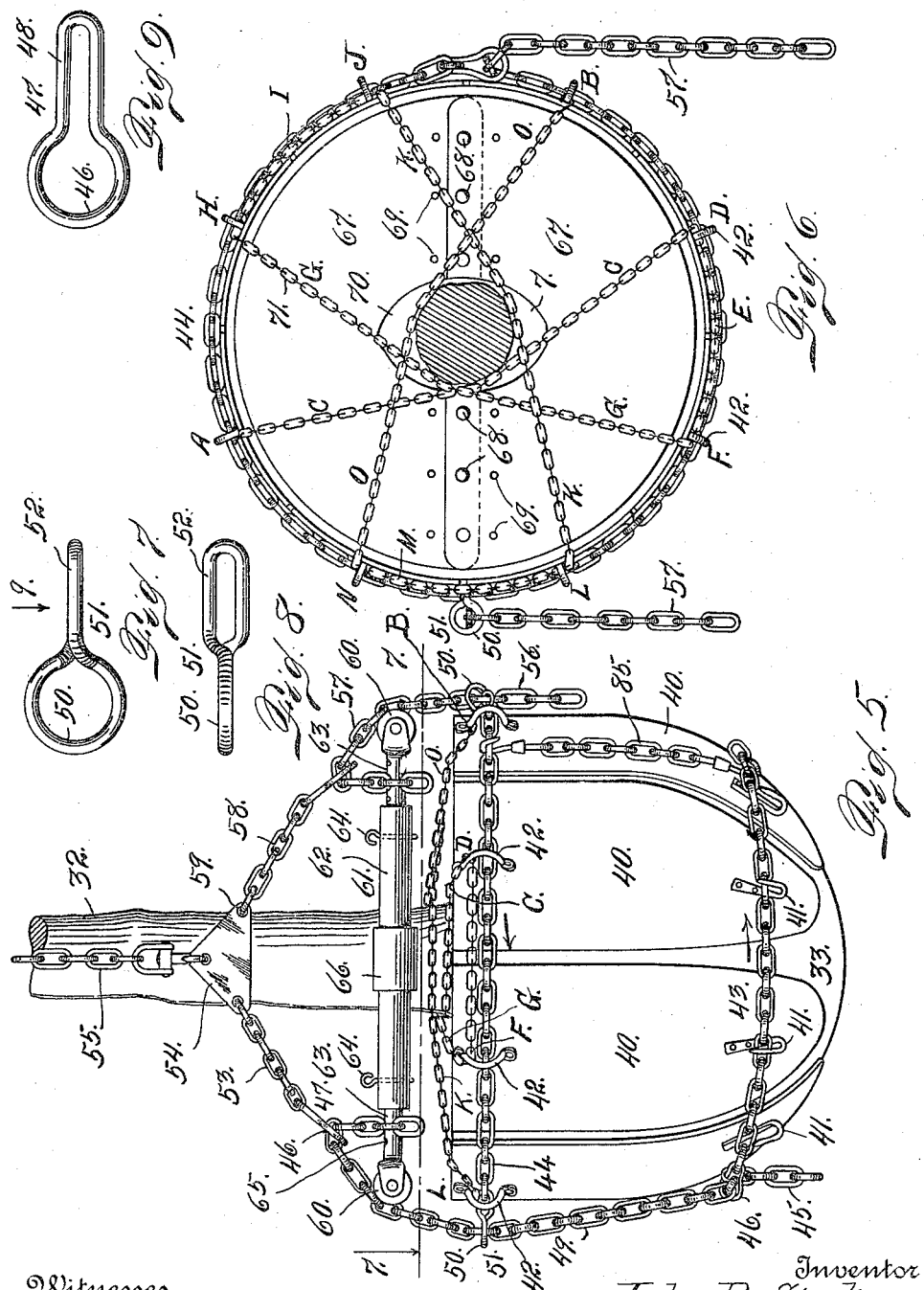

JOHN B. SPUHR, OF DENVER, COLORADO.

APPARATUS FOR TRANSPLANTING TREES.

1,139,735.   Specification of Letters Patent.   Patented May 18, 1915.

Application filed June 13, 1914. Serial No. 844,985.

*To all whom it may concern:*

Be it known that I, JOHN B. SPUHR, a citizen of the United States, residing in the city and county of Denver and State of Colorado, have invented certain new and useful Improvements in Apparatus for Transplanting Trees; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in tree-transplanting apparatus, my object being to provide a structure of this class which shall be efficient for the object intended, and which shall be so constructed as to handle with ease relatively large trees. In order to transplant these trees successfully it is necessary that a large quantity of dirt shall be carried upon the roots and it is this ball of dirt which gives the tree great weight and which requires a strong structure as well as lifting and hoisting apparatus of peculiar power and advantage, in order that hand power may be employed for lifting the tree and the mass of dirt upon its roots from the ground and putting it in place upon the vehicle; also in removing it from the vehicle and depositing it in its new position.

My improvement consists in the means which are applied to the ball of the tree (meaning the mass of dirt and the roots to which the dirt clings), whereby this ball may be protected to prevent the dirt from shaking loose from the roots, and also securely and tightly held together during the hoisting and other manipulating operation. This device consists of a sort of sectional basket or receptacle composed of a series of members which are held together by chains which surround the said sections or plates both at the top and bottom, suitable connections being made between these chains and the hoisting apparatus whereby as the tree with its ball of roots and dirt is hoisted, the members of the sectional basket or receptacle are held tightly in place.

Having briefly outlined my improved construction, I will proceed to describe the same in detail, reference being made to the accompanying drawing in which is illustrated an embodiment thereof.

In this drawing: Figure 1 is a side elevation of my improved machine showing a tree in position to be transported. Fig. 2 is a rear end view of the apparatus or a view looking in the direction of arrow 3, Fig. 1. Fig. 3 is a detail view of one of the sections composing the basket or receptacle adapted to be used in connection with the ball of the tree, shown on a larger scale than in Fig. 1. Fig. 4 is a top plan view of one of the top plates forming a part of the said basket or receptacle, shown on a larger scale than in Fig. 1. Fig. 5 is an elevation of the basket or receptacle applied to the ball of the tree, also shown on a larger scale than in Fig. 1. Fig. 6 is a section taken on the line 7—7, Fig. 5, looking downwardly. Figs. 7 and 8 illustrate a compound loop, one loop member being circular and the other elongated, the two members occupying positions at right angles to each other, Fig. 8 being a view looking in the direction of arrow 9, Fig. 7. Fig. 9 is a detail view of a compound loop having a circular and an elongated member, the two members occupying the same plane.

The same reference characters indicate the same parts in all the views.

Let the numeral 5 designate a framework mounted upon front and rear wheels 6 and 7. This framework as shown in the drawing includes two horizontally disposed I-beams 8 whose forward extremities are suitably connected with a bolster 9 in front and with stub axles 10 in the rear, upon which the rear wheels 7 are journaled. These I-beams are farthest apart in the rear and approach each other as they extend forwardly. To the rear portion of the I-beams 8 is secured a top plate 12 which is approximately semicircular in the rear and is provided with an angle bar 13 secured to its curved edge by means of bolts 14.

Between the rear portions of the I-beams, and partially surrounded by the angle bar 13 of the top plate 12, is an opening through which the ball of the tree may be lifted when removing it from its original location, and through which it may be dropped when depositing it in its new location. Extending upwardly from the horizontal framework just described are two rearwardly located bars 17 and two forwardly located bars 18, the four bars being inclined and connected together at the top by means of a plate 19 carrying a depending eye 20 supporting a pulley block 21 located below the plate. Mounted upon this plate is a pulley 22 mounted on a horizontal axis, and two vertically disposed rollers 23 separated to receive a cable 24 which engages the pulley 22. The rollers 23 act as anti-frictional guides for the cable 24 which is connected with a windlass 25 journaled on the bars 18 as shown at 26, the shaft 27 of the windlass having hand cranks 28.

The cable after passing over the pulley 22 and between the rollers 23, extends rearwardly to a pulley block 29 carrying a hook 30 connected with a band 31 surrounding the trunk 32 of the tree at a distance above the ball 33. The cable then passes to a second pulley block 34 connected with an eye 35 supported on the top plate 19. The cable passes thence again around the pulley block 29, and thence toward the pulley block 34 where it is connected with an eye or loop 36 carried by the last named block as shown at 37. The windlass is equipped with a ratchet disk 38 whose teeth are adapted to be engaged by a pawl 39 mounted on one of the frame bars 18.

To the ball 33 of the tree is applied a basket composed of distinct members 40, each of which has a hook 41 attached to its lower portion and a loop 42 attached to its upper portion. Chains 43 and 44 are employed to hold these basket members in place, the said chains constituting in fact a portion of the basket, the chains being tightly drawn around the members of the basket as the tree is hoisted. The manner of applying these chains to the basket sections will now be described. The extremity 45 of the chain 43 has a few links drawn through the eye part 46 of a compound loop 47, after which one of the links is inserted in the elongated part 48 of the said loop, thus locking the chain extremity against pulling through the loop. The chain 43 is then passed around the basket sections 40 in the direction indicated by the arrow in Fig. 5, the chain engaging the hooks 41 which support it from slipping downwardly. After passing entirely around the lower portion of the ball of the tree, this chain is passed through the eye 46 of the loop 47 and carried upwardly as shown at 49, and through the eye extremity 50 of a loop 51 having an elongated member 52 occupying a plane at right angles to the eye 50, this loop 51 being carried by the chain 44. The chain part 49 is carried upwardly above the loop 51 and after passing through the eye 46 of another loop 47, one of its links is inserted in the elongated part 48, thus locking the upper extremity of the chain in the loop. This last named loop 47 is connected by means of a short chain 53 with one corner of a triangular plate 54 which is supported by a chain 55, which is connected in operative relation with the pulley block 21.

The chain 44 has one extremity 56 passed through the eye extremity 50 of a loop 51, after which one of the links is slipped into the elongated part 52, thus locking the chain against pulling out of the loop. The chain 44 is then passed around the ball of the tree in the direction indicated by the arrow in Fig. 5, being passed through the loops 42, and after extending entirely around the upper portion of the ball, it is carried upwardly through the eye 50 of the loop 51 and extends above the same as shown at 57, being finally passed through the eye 46 of a loop 47, one of the links being secured in the elongated portion 48 of the said loop. The last named loop 47 is connected with a short chain 58 connected with the triangular plate 54 as shown at 59.

The upper portions 57 of the two chains are engaged on the inside by the roller extremities 60 of a spacing bar 61 composed of a tubular member 62 into which end members 63 telescope, the tubular member having an opening in each end to receive pins 64 which enter openings 65 formed in the telescoping members 63. By virtue of this construction the spacing bar is extensible or endwise adjustable to harmonize with the diameter of the ball of the tree. The central portion of the tubular member 62 of the spacing bar carries an anti-frictional roller 66 adapted to engage the trunk of the tree when the latter is in the proper position. This roller prevents the spacing bar from injuring the bark of the tree during the manipulation of the latter.

To the top of the tree ball are applied two semicircular plates 67 which overlap each other in the center, where they are connected by pins 68 passed through openings 69 formed in the overlapping portions of the plates, there being several sets of these openings in order that the plates 67 may be adjusted to harmonize with the circular area of the top of the tree ball. These plates 67 are recessed as shown at 70 to make room for the trunk of the tree. These plates are held in place upon the tree ball and made to form a part of the basket in which the latter is encased, by means of a chain 71 which is passed above the plates on opposite sides of the trunk of the tree, its extremities being secured to two of the loops 42 as shown at A and D. If we commence at A, the chain extends across the top of the ball as shown at C, thence through a loop 42 as shown at D, thence horizontally as shown at E, through a loop 42 as shown at F, thence across the top of the tree ball above the plate 67 as shown at G, thence through a loop 42 as shown at H, thence horizontally as shown at I and through the next loop 42 as shown at J, thence across the top of the tree ball above the plates as shown at K, thence through a loop 42 as shown at L, thence horizontally as shown at M, through another loop 42 as shown at N, and thence across above the tree ball as shown at O, to the loop 42 at the point B to which the opposite extremity of the chain is secured. The course and arrangement of the chain 71 can best be followed by reference to Fig. 6.

It is evident that any other suitable chain arrangement connected with the loops 42 and extending above the plate 67 applied to the top of the tree ball may be employed without in any way departing from the spirit of the invention.

In order to operate the pulley block 21 for the purpose of raising the ball of the tree from its location after it has been loosened and the basket applied thereto, an endless chain 72 may be employed. This chain is applied to a sprocket member 73 mounted upon the pulley block 21, the chain hanging down far enough to permit manual operation.

In further explanation of the construction of the framework, each bar 17 has a depending plate 75 projecting below the stub axle 10, the two depending plates being connected by a rod 76, the extremities of the rod being interlocked with metal loops 77 with which the parts 75 are equipped.

To the bars 18 are attached rods 81 which are secured at their lower extremities to the said bars by nuts 82, from which point the rods curve outwardly as shown at 83, and then extend upwardly parallel with the bars 18, their upper extremities being bent inwardly and secured to the upper extremity of the structure. These rods serve to facilitate the passage of the vehicle underneath trolley wires, where they are too low to allow the structure to pass without engagement. In this event, the trolley wire will be gradually lifted by the rods 81 whose upper extremities 84 form the highest part of the structure, thus allowing the entire framework to pass without serious obstruction.

When the apparatus is in use, the rod 76 is detached from the vehicle and the latter backed into position to allow the body of the tree to project upwardly in the rear and between the inclined channel bars 17, while the opening in the rear portion of the framework is directly above the roots of the tree. The band 31 is then applied to the body of the tree and connected with the pulley block 29, the cable 24 being adjusted by means of the windlass 25, to support the body of the tree as the root ball is raised from the ground, the cable being gradually paid out to allow the tree body to move downwardly as the ball is lifted. It may be assumed that before the vehicle has taken its position for handling the tree, the ball has been loosened and the basket applied thereto. Then as soon as the vehicle is put in position and the cable connecting with the trunk of the tree through the instrumentality of the pulley blocks 29 and 34, the hoisting chain 55 is connected with the triangular plate 54 and as the pulley block 21 is operated, the ball of the tree is gradually lifted to the position shown in Fig. 1, the trunk of the tree being allowed to move downwardly to the proper inclination for transporting purposes, as also illustrated in the same figure. The tree is then mounted upon the vehicle and may be carried to the desired location for replanting.

The two chains 43 and 44 which connect the basket sections in running relation at the bottom and top respectively, are connected by a vertically disposed chain section 85 which has a tendency to maintain the two chains 43 and 44 in their proper relative positions upon the basket.

Having thus described my invention, what I claim is,—

1. In apparatus of the class described, a basket composed of a series of distinct sections, flexible devices surrounding the basket in running relation at two circumferences, the said devices being carried upwardly above the basket, for the purpose set forth.

2. A basket adapted to be applied to the root-ball of a tree, the same being composed of a series of distinct sections, a cover adapted to be applied to the top of the ball and composed of two plates connected and centrally recessed to make room for the trunk of the tree, flexible devices surrounding the basket at two circumferences, and other flexible devices connected with the uppermost flexible device and extending across the top of the basket, whereby the cover is held in place, substantially as described.

3. A basket adapted to be applied to the root-ball of a tree, the said basket being composed of distinct and separate sections, flexible devices connecting the said sections in running relation near the top and bottom of the basket, a cover applied to the top of the ball of the tree and having an opening to receive the trunk thereof, and a flexible device connected with the basket sections and passing over the basket cover, whereby the said cover is held in place, substantially as described.

4. A basket composed of a series of distinct sections adapted to be applied to the root-ball of the tree, the said sections having hooks near their lower extremities and loops near their upper extremities, and flexible devices passed around the basket sections and respectively engaging the hooks and loops in running relation, for the purpose set forth.

5. A basket composed of a series of sections, a flexible device passed around the said sections in running relation with the bottom thereof and carried upwardly on one side of the basket, a second flexible device passed around the sections near their upper extremities and engaging the same in running relation, the second flexible device being carried upwardly on the opposite side from the first named flexible device, means located above the basket for spacing the two flexible devices, and means for connecting the two flexible devices with hoisting mechanism.

6. A sectional basket having two flexible devices applied thereto and engaging the basket sections in running relation, the flexible devices being carried upwardly above the basket and adapted to be connected in operative relation with hoisting mechanism, and a spacing device interposed between the basket and the hoisting mechanism for separating the flexible devices from the basket, substantially as described.

7. A basket composed of a series of separate and distinct sections, flexible devices connecting the said sections in running relation and located at two circumferences, the flexible devices being carried upwardly above the basket and adapted to be connected in operative relation with hoisting mechanism, and a spacing device located above the basket and having anti-frictional rollers at its extremities which engage the flexible devices, for the purpose set forth.

8. A basket composed of a series of separate and distinct sections adapted to be applied to the root-ball of a tree, flexible devices connecting the said sections in running relation, and respectively located at two circumferences of the basket, the flexible devices being carried upwardly above the basket, means for spacing the flexible devices above the basket, and means for connecting the two flexible devices with hoisting mechanism, for the purpose set forth.

In testimony whereof I affix my signature in presence of two witnesses.

JOHN B. SPUHR.

Witnesses:
MAZE KIRBY,
A. EBERT O'BRIEN.

Copies of this patent may be obtained for five cents each, by addressing the "Commissioner of Patents, Washington, D. C."